(12) United States Patent
Bernard et al.

(10) Patent No.: US 11,661,185 B2
(45) Date of Patent: May 30, 2023

(54) REDUNDANT ELECTRIC PROPULSION SYSTEM

(71) Applicant: Bell Textron Inc., Fort Worth, TX (US)

(72) Inventors: Guy Bernard, Kirkland (CA); Jeffrey Epp, Bedford, TX (US); William K. Heironimus, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 129 days.

(21) Appl. No.: 17/175,297

(22) Filed: Feb. 12, 2021

(65) Prior Publication Data
US 2022/0258873 A1 Aug. 18, 2022

(51) Int. Cl.
*B64C 31/06* (2020.01)
*B64D 27/24* (2006.01)
*B64D 35/02* (2006.01)
*B60L 50/60* (2019.01)
*B60L 3/00* (2019.01)

(52) U.S. Cl.
CPC ............ *B64C 31/06* (2013.01); *B60L 3/0061* (2013.01); *B60L 50/60* (2019.02); *B64D 27/24* (2013.01); *B64D 35/02* (2013.01); *B60L 2200/10* (2013.01)

(58) Field of Classification Search
CPC ..................................................... B64D 27/24
See application file for complete search history.

(56) References Cited

U.S. PATENT DOCUMENTS

| 10,450,080 | B1 * | 10/2019 | Beach ..................... B64D 27/10 |
| 2011/0024555 | A1 * | 2/2011 | Kuhn, Jr. ............ B64C 29/0033 |
| | | | 244/17.11 |
| 2014/0097290 | A1 * | 4/2014 | Leng ....................... B64C 11/46 |
| | | | 244/6 |
| 2014/0248168 | A1 | 9/2014 | Chantriaux et al. |
| 2017/0190435 | A1 | 7/2017 | Kobayashi et al. |
| 2018/0354613 | A1 | 12/2018 | Cvrlje |
| 2019/0202559 | A1 * | 7/2019 | Levy ..................... B64C 11/001 |

(Continued)

FOREIGN PATENT DOCUMENTS

| CN | 112133972 A | 12/2020 |
| DE | 102015226836 A1 * | 7/2017 |

(Continued)

OTHER PUBLICATIONS

European Search Report dated Nov. 30, 2021 for Application No. 21178639.7, 5 pages.

*Primary Examiner* — Timothy D Collins
*Assistant Examiner* — Justin Michael Heston
(74) *Attorney, Agent, or Firm* — Frost Brown Todd LLP (57) ABSTRACT

A propulsion system for providing propulsion of an aircraft includes a plurality of electric motors coupled with a rotor of the aircraft to drive the rotor and a propulsion motor control. The propulsion motor control includes at least one processor electrically connected with at least one electric motor to actuate the at least one electric motor and at least one battery electrically connected with the at least one processor and at least one electric motor to provide power to the at least one processor and the at least one electric motor. The propulsion motor control actuates the plurality of electric motors based on a desired torque level to drive the rotor to provide propulsion of the aircraft.

19 Claims, 4 Drawing Sheets

(56) References Cited

U.S. PATENT DOCUMENTS

2019/0300193 A1  10/2019  Riedel
2020/0148376 A1   5/2020  Kawai

FOREIGN PATENT DOCUMENTS

| DE | 102015226836 A1 |   | 7/2017  |            |
|----|-----------------|---|---------|------------|
| EP | 3546352 A1      | * | 10/2019 | B60L 53/16 |
| FR | 3079819 A1      | * | 10/2019 | B60L 1/003 |
| KR | 102211475 B1    | * | 2/2021  |            |
| WO | WO 2018/063019 A1 |   | 4/2018  |            |
| WO | WO 2019/005131 A1 |   | 1/2019  |            |
| WO | WO-2020003181 A1 | * | 1/2020  | B60L 50/75 |
| WO | WO-2021005304 A1 | * | 1/2021  | B64D 27/24 |

* cited by examiner

REDUNDANT ELECTRIC PROPULSION SYSTEM

TECHNICAL FIELD

The present disclosure is directed to in general to the field of aircraft and, more particularly, though not exclusively, to a redundant electric propulsion system for use in connection with such aircraft.

BACKGROUND OF THE INVENTION

Aircrafts are typically driven by a propulsion system having a fuel-powered engine, such as a reciprocating engine and/or a turbine engine. These engines generally ignite fuel to provide power to propel the aircraft. Such fuel-powered systems may be expensive to operate and/or maintain, emit higher levels of noise during operation, and/or have a harmful effect on the environment.

BRIEF SUMMARY OF THE INVENTION

In some instances, it may be desirable to provide an electric propulsion system for aircrafts, such as mutli-rotor aircrafts, instead of a fuel-powered propulsion system. Such electric propulsion systems use electricity instead of fuel to propel the aircraft, which may decrease costs for operating and/or maintaining the system, decrease noise emitted from the system, and/or decrease the effect on the environment. Accordingly, an electronic propulsion system is described herein for operating aircrafts, such as a multi-rotor aircraft.

In one embodiment, a propulsion system for controlling propulsion of an aircraft having two or more rotors can comprise: a plurality of electric motors coupled with each rotor of the two or more rotors for driving the two or more rotors, a propulsion motor control, and a flight control. The propulsion motor control can comprise at least one propulsion control unit electrically connected with at least one electric motor of the plurality of electric motors, wherein the at least one propulsion control unit is configured to actuate the at least one electric motor, and at least one battery electrically connected with the at least one propulsion control unit of the propulsion motor control and at least one electric motor of the plurality of electric motors, wherein the at least one battery is configured to provide power to the at least one propulsion control unit and the at least one electric motor. The flight control is coupled with the least one propulsion control unit and is configured to transmit a desired torque level to the at least one propulsion control unit. The propulsion motor control is configured to actuate the plurality of electric motors based on the desired torque level to drive two or more rotors to provide propulsion of the aircraft.

In another embodiment, a method of operating a propulsion system for controlling propulsion of an aircraft having two or more rotors, wherein the propulsion system comprises a plurality of electric motors coupled with each rotor of the two or more rotors, a propulsion motor control having at least one propulsion control unit electrically connected with at least one electric motor of the plurality of electric motors and at least one battery electrically connected with the at least one propulsion control unit of the propulsion motor control and at least one electric motor of the plurality of electric motors, and a flight control coupled with the propulsion motor control, can comprise the steps of: transmitting a desired torque level from the flight control to the propulsion motor control; and actuating the plurality of electric motors via the propulsion motor control based on the desired torque level to drive each rotor to provide propulsion of the aircraft.

In another embodiment, a propulsion system for providing propulsion for an aircraft can comprise: a plurality of electric motors coupled with at least one rotor of the aircraft such that each electric motor of the plurality of electric motors is configured to drive the at least one rotor; and a propulsion motor control electrically connected with each electric motor of the plurality of electric motors. The propulsion motor control is configured to actuate each electric motor of the plurality of electric motors based on a desired torque level. The plurality of electric motors are configured to drive the at least one rotor based on the desired torque level to provide propulsion of the aircraft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
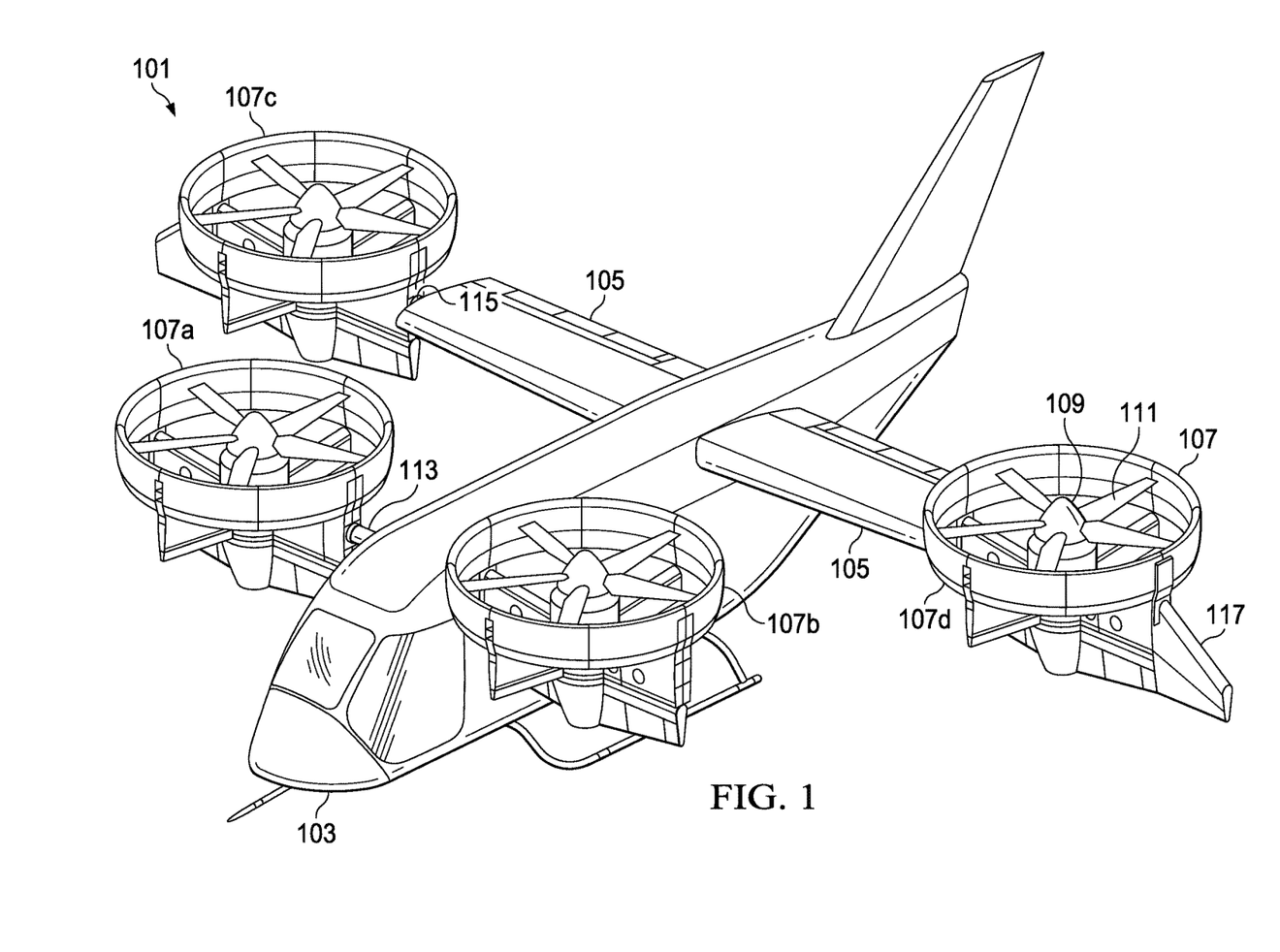
FIG. 1 is a perspective view of an exemplary tiltrotor aircraft, showing the aircraft operating in a helicopter mode.
Figure 2:
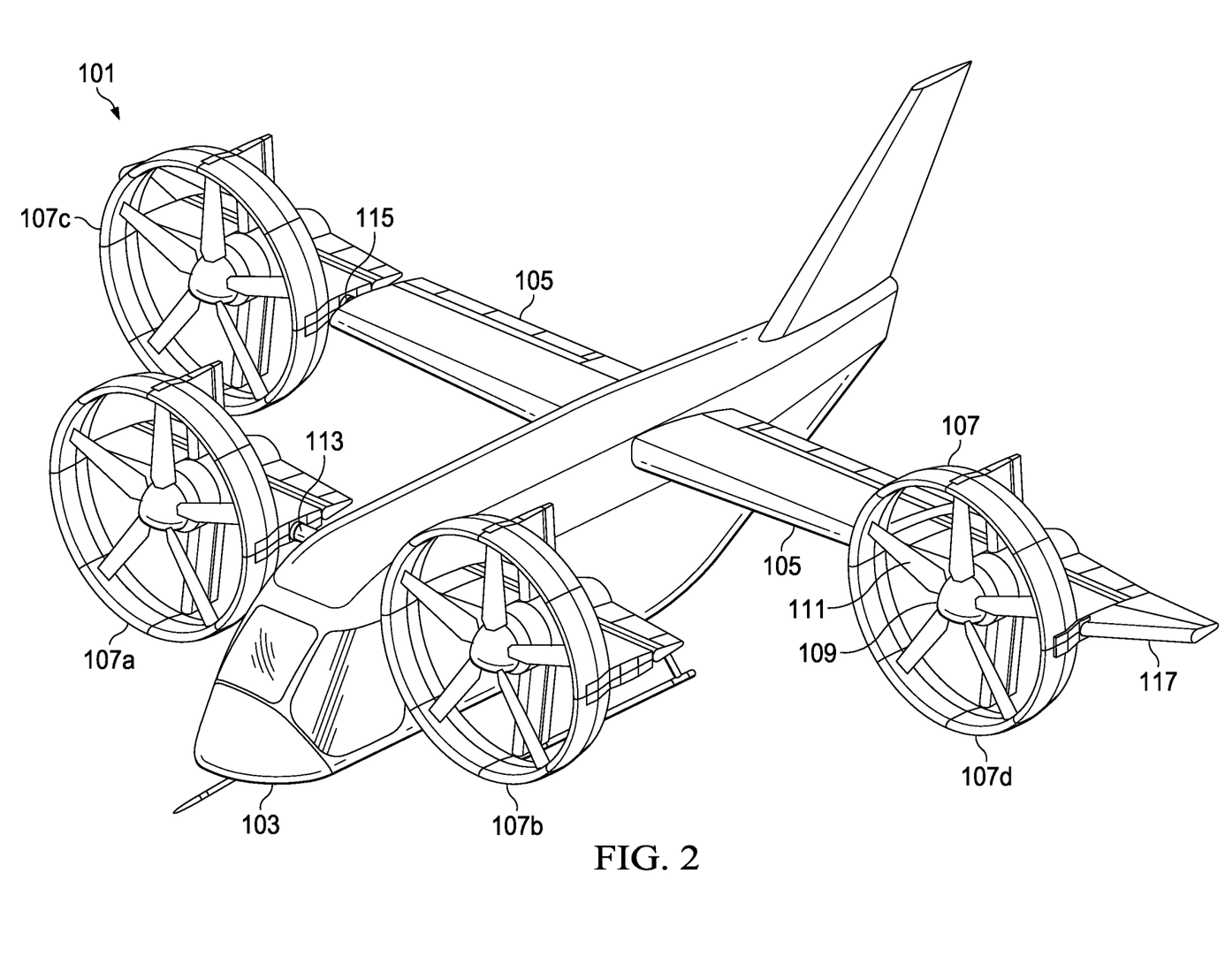
FIG. 2 is a perspective view of the aircraft of FIG. 1, showing the aircraft operating in an airplane mode.

Referring now to FIGS. 1 and 2, an exemplary tiltrotor aircraft 101 is shown that includes ducted rotors (or fans). The tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing. Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

In the illustrated version, aircraft 101 is configured with four ducts 107, including a first duct 107a and a second duct 107b that form a forward pair of ducts and a third duct 107c and a fourth duct 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducts 107 may be tiltable between the vertical and horizontal positions by spindles 113, 115, which are rotatable in response to commands originating from a pilot and/or a flight control system of the aircraft 101.

Rotors 109 of aircraft 101 can be driven by a redundant electric propulsion system to provide propulsion to aircraft 101. Such a redundant electric propulsion system can include a propulsion control system for controlling movement of rotors 109 and a power system for providing power to the propulsion control system. The propulsion control system can include at least two electric motors coupled with each rotor 109 to provide redundancy in driving each respective rotor 109. Each electric motor can include an overrun clutch for coupling the respective electric motor with the respective rotor 109. This may mitigate jamming of the respective electric motor, as will be discussed in more detail below. The propulsion control system can further include a propulsion control unit for each electric motor to actuate the respective electric motor based on a desired torque level provided by a flight control system. The power system can include a battery for each propulsion control unit and each electric motor to provide power to the respective propulsion control units and electric motors. In some versions, each propulsion control unit and each battery are coupled with a pair of electric motors positioned on opposite sides of aircraft 101. This may provide a distributed propulsion system for aircraft 101 such that a failure of a single component of the redundant electric system inhibits aircraft un-balance and/or loss of control, as will be discussed in more detail below.

Figure 3:
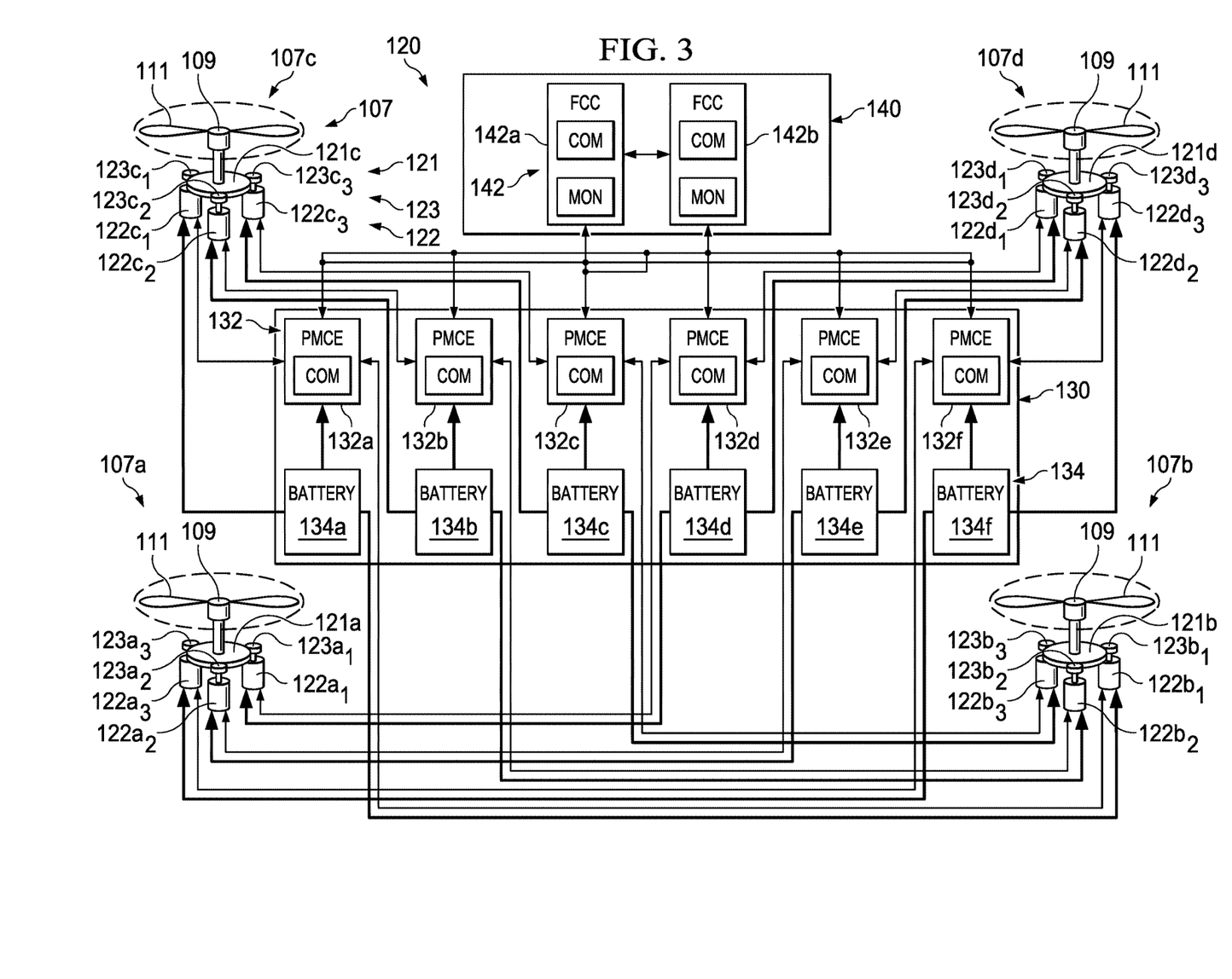
FIG. 3 is a schematic of an exemplary redundant electric propulsion system that may be incorporated into the aircraft of FIG. 1 for controlling the propulsion of the aircraft.

Referring to FIG. 3, a preferred embodiment of an exemplary redundant electric propulsion system 120 is shown having a propulsion control system and a power system to provide propulsion to aircraft 101 (see FIG. 1). The propulsion control system of system 120 includes at least two electric motors 122 coupled with each rotor 109 to provide redundancy in driving each respective rotor 109. In the illustrated version, each electric motor 122 interface to a gearbox 121 of a rotor 109 via an over-run clutch 123. The propulsion control system further includes a Propulsion Motor Control Electronic unit (PMCE) 132 for actuating each electric motor 122 based on a desired torque level provided by a Flight Control Computer (FCC) 142. The power system of system 120 includes a battery 134 for providing power to each PMCE 132 and electric motors 122. In the illustrated version, one PMCE 132 and one battery 134 feed two electric motors 122 located at opposite sides of aircraft 101 (see FIG. 1), as will be discussed in more detail below.

As shown in FIG. 3, system 120 comprises at least one electric motor 122, a propulsion motor control 130, and a flight control 140. The at least one electric motor 122 is coupled with at least one duct 107 of aircraft 101 (see FIG. 1) for driving rotor 109 of the at least one duct 107. In the illustrated version, each duct 107 is coupled with a plurality of electric motors 122, such as three electric motors 122. Any two or more of the plurality of motors 122 is configured to drive the attached rotor 109 of a respective duct 107 via a gearbox 121. This may provide a triple redundancy for operating a respective rotor 109 such that rotor 109 may continue to be driven in the event of a failure of a motor 122. Each motor 122 of the illustrated version comprises an overrun clutch 123 for mechanically coupling each motor 122 with a respective gearbox 121. Each overrun clutch 123 is configured to transmit torque from a respective motor 122 to rotor 109 in only one direction and permits rotor 109 to freewheel, or continue rotating, when the respective motor 122 is rotating at a slower speed than rotor 109 and/or is stopped. Overrun clutch 123 may thereby mitigate motor jam of system 120.

Accordingly, first duct 107a includes a first motor $122a_1$ coupled to a first gearbox 121a via a first overrun clutch $123a_1$, a second motor $122a_2$ coupled to first gearbox 121a via a second overrun clutch $123a_2$, and a third motor $122a_3$ coupled to first gearbox 121a via a third overrun clutch $123a_3$. Second duct 107b includes a first motor $122b_1$ coupled to a second gearbox 121b via a first overrun clutch $123b_1$, a second motor $122b_2$ coupled to second gearbox 121b via a second overrun clutch $123b_2$, and a third motor $122b_3$ coupled to second gearbox 121b via a third overrun clutch $123b_3$. Third duct 107c includes a first motor $122c_1$ coupled to a third gearbox 121c via a first overrun clutch $123c_1$, a second motor $122c_2$ coupled to third gearbox 121c via a second overrun clutch $123c_2$, and a third motor $122c_2$ coupled to third gearbox 121c via a third overrun clutch $123c_3$. Fourth duct 107d includes a first motor $122d_1$ coupled to a fourth gearbox 121d via a first overrun clutch $123d_1$, a second motor $122d_2$ coupled to fourth gearbox 121d via a second overrun clutch $123d_2$, and a third motor $122d_2$ coupled to fourth gearbox 121d via a third overrun clutch $123d_3$. Still other suitable configurations for ducts 107 can be used. For instance, each duct 107 may alternatively be implemented with more or fewer motors 122 and/or overrun clutches 123. For example, the redundant propulsion system described herein would be easily adaptable to any electric aircraft with an even number of rotors such as six, eight or more.

Propulsion motor control 130 is electrically coupled with motors 122 to actuate motors 122. Propulsion motor control 130 of the illustrated version comprises one or more Propulsion Motor Control Electronic units (PMCE) 132 and one or more batteries 134. Each PMCE 132 includes a processor having a command module (COM) that is electrically connected with one or more motors 122 of one or more ducts 107 such that each PMCE 132 is configured to send and/or receive signals from the one or more motors 122. Each battery 134 is electrically connected with one or more PMCEs 132 and/or motors 122 such that each battery 134 is configured to provide power to the one or more PMCEs 132 and/or motors 122. For instance, each battery 134 may provide about 28 Volts to a respective PMCE 132 and/or about 600 Volts to a respective motor 122, though any other suitable amounts of power can be used.

In the illustrated version, each PMCE 132 is coupled with two motors 122 that are diagonally positioned relative to each other such that one PMCE 132 is coupled with a motor 122 of a duct 107a, 107b in the forward position on one side of aircraft 101 (see FIG. 1) and with a motor 122 of a duct 107c, 107d in the aft position on an opposite side of aircraft 101 (see FIG. 1). Accordingly, if one PMCE 132 fails, the effected motors 122 of such a failure are distribute on opposite sides of aircraft 101 (see FIG. 1). One battery 134 of the illustrated version is also coupled with two motors 122 that are diagonally positioned relative to each other such that one battery 134 is coupled with a motor 122 of a duct 107a, 107b in the forward position on one side of aircraft 101 (see FIG. 1) and with a motor 122 of a duct 107c, 107d in the aft position on an opposite side of aircraft 101 (see FIG. 1). Accordingly, if one battery 134 fails, the effected motors 122 of such a failure are distribute on opposite sides of aircraft 101 (see FIG. 1). This may inhibit aircraft un-balance or loss of control in the event of a failure of a component of propulsion motor control 130.

Accordingly, as shown in FIG. 3, a first PMCE 132a is coupled with first motor 122b$_1$ of second duct 107b and first motor 122c$_1$ of third duct 107c. A first battery 134a is then coupled with first PMCE 132a and first motors 122b$_1$, 122c$_1$. A second PMCE 132b is coupled with second motor 122b$_2$ of second duct 107b and second motor 122c$_2$ of third duct 107c. A second battery 134b is then coupled with second PMCE 132b and second motors 122b$_2$, 122c$_2$. A third PMCE 132c is coupled with third motor 122b$_3$ of second duct 107b and third motor 122c$_3$ of third duct 107c. A third battery 134c is then coupled with third PMCE 132c and third motors 122b$_3$, 122c$_3$. A fourth PMCE 132d is coupled with first motor 122a$_1$ of first duct 107a and first motor 122d$_1$ of fourth duct 107d. A fourth battery 134d is then coupled with fourth PMCE 132d and first motors 122a$_1$, 122d$_1$. A fifth PMCE 132e is coupled with second motor 122a$_2$ of first duct 107a and second motor 122d$_2$ of fourth duct 107d. A fifth battery 134e is then coupled with fifth PMCE 132e and second motors 122a$_2$, 122d$_2$. A sixth PMCE 132f is coupled with third motor 122a$_3$ of first duct 107a and third motor 122d$_3$ of fourth duct 107d. A sixth battery 134f is then coupled with sixth PMCE 132f and third motors 122a$_3$, 122d$_3$. Still other suitable configurations for propulsion motor control 130 can be used. For instance, propulsion motor control 130 may alternatively be implemented with more or fewer PMCEs 132 and/or batteries 134. Further, components of propulsion motor control 130 may be housed in a single enclosure or alternatively in two or more separate enclosures.

Flight control 140 is electrically connected with propulsion motor control 130 to transmit a desired torque or speed to propulsion motor control 130 for actuating motors 122 to drive rotors 109 at the desired torque or speed. Flight control 140 can further be configured to control the direction, thrust, and/or lift of ducts 107. As shown in FIG. 3, flight control 140 comprises a first FCC 142a and a second FCC 142b that each include a processor having a command module (COM) and a monitoring module (MON) that is electrically connected one or more PMCEs 132 of propulsion motor control 130 such that each FCC 142 is configured to send, receive, and/or monitor signals from the one or more PMCEs 132. While each FCC 142 is shown as being coupled with each PMCE 132, other suitable configurations for flight control 140 can be used. For instance, flight control 140 may alternatively be implemented with more or fewer FCCs 142. Further, components of flight control 140 may be housed in a single enclosure or alternatively in two or more separate enclosures.

In some versions, system 120 is configured to inhibit failure of system 120 by providing components that are dissimilar from each other, such as having different types of parts and/or being provided by different manufacturers. For instance, first and second FCCs 142a, 142b may include one or more components that differ from each other to provide a dual dissimilar flight control 140. Propulsion motor control 130 may also include PMCEs 132 having one or more components that differ from each other. In the illustrated version, first and fourth PMCEs 132a, 132d may include one or more components that differ from second and fifth PMCEs 132b, 132e, which may include one or more components that differ from third and sixth PMCEs 132c, 132f to provide a triple dissimilar propulsion. Likewise, first motors 122a$_1$, 122b$_1$, 122c$_1$, 122d$_1$ may include one or more components that differ from second motors 122a$_2$, 122b$_2$, 122c$_2$, 122d$_2$, which may include one or more components that differ from third motors 122a$_3$, 122b$_3$, 122c$_3$, 122d$_3$. Still other suitable configurations for system 120 will be apparent to one with ordinary skill in the art in view of the teachings herein.

Figure 4:
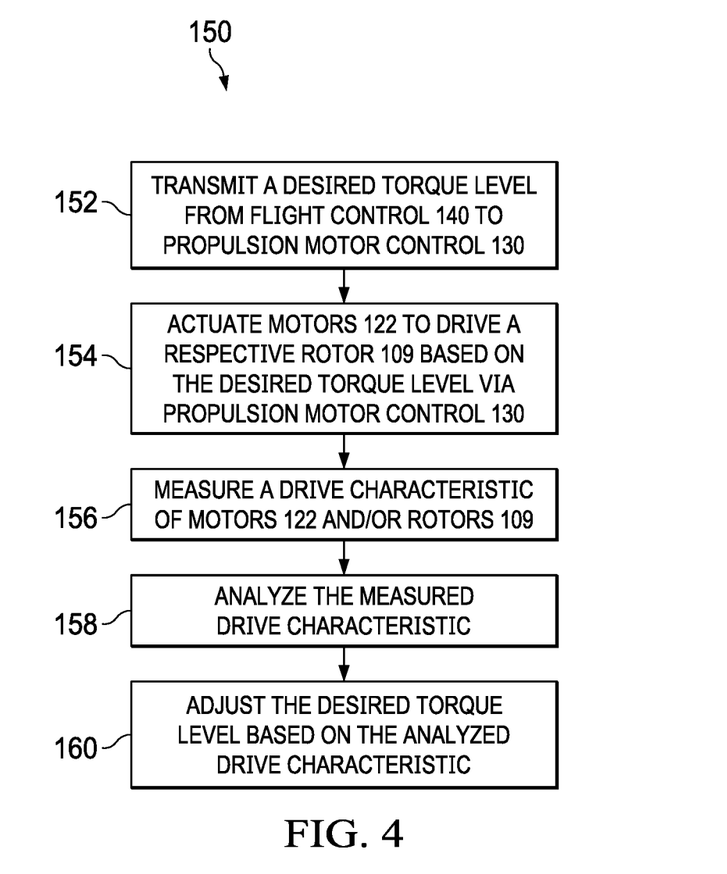
FIG. 4 is a schematic of an exemplary method of operating the redundant electronic propulsion system of FIG. 3.

Referring to FIG. 4, a method 150 is shown for operating redundant electric propulsion system 120 to control propulsion of ducts 107 of aircraft 101 (see FIG. 1). Method 150 comprises a step 152 of transmitting a desired torque level, such as a desired speed and/or revolutions per minute (rpm) for a respective rotor 109 and/or motor 122, from flight control 140 to propulsion motor control 130. For instance, one or more FCCs 142 of flight control 140 may transmit the desired torque level to one or more PMCEs 132 of propulsion motor control 130. In the illustrated version, each of first and second FCCs 142a, 142b is configured to transmit the desired torque level to each PMCE 132. Method 150 further comprises a step 154 of actuating motors 122 to drive a respective rotor 109 based on the desired torque level via propulsion motor control 130. For instance, one or more PMCEs 132 of propulsion motor control 130 can actuate one or more motors 122 based on the desired torque level. In the illustrated version, each PMCE 132 is configured to actuate a pair of motors 122, one motor 122 in a forward duct 107a, 107b and one motor 122 in an aft duct 107c, 107d. System 120 can be configured to transmit one or more desired torque levels such that rotors 109 can be operated at the same torque level and/or one or more rotors 109 can be operated at a varying torque level relative to the other rotors 109.

In some versions, ducts 107 and/or motors 122 include one or more sensors (not shown) that are configured to measure one or more drive characteristics of rotors 109 and/or motors 122, such as a torque, a speed, a temperature, a pitch angle, a thrust, a position, and/or other drive characteristic. Accordingly, method 150 may include a step 156 to measure one or more drive characteristics of rotors 109 and/or motors 122. For instance, system 120 can be configured to transmit the measured drive characteristic to PMCEs 132 of propulsion motor control 130 and/or FCCs 142 of flight control 140 to provide a closed-loop propulsion control. Method 150 may further include a step 158 of analyzing the measured drive characteristic. For instance, propulsion motor control 130 and/or flight control 140 can be configured to analyze the measured drive characteristic. Accordingly, propulsion motor control 130 and/or flight control can determine whether rotors 109 and/or motors 122 are sufficiently operating at the desired torque level and/or whether a fault, such as a discrepancy and/or failure, of one or more of components of system 120 has occurred.

As shown in Table 1 below, system 120 can be configured to detect a fault of one or more of components of system 120. For instance, whether a gearbox 121, a rotor 109, a motor 122, and/or a clutch 123 has jammed, disconnected, and/or failed. System 120 can also be configured to determine whether one or more of sensors, PMCEs 132, batteries 134, and/or FCCs 142 has an error and/or has failed. These faults can have an immediate effect on system 120 and/or aircraft 101 (see FIG. 1). Some examples of such effects are provided in Table 1. System 120 can then be configured to provide a system response based on the detected fault to have an aircraft level effect to thereby minimize the criticality of the fault. For instance, in the event of a motor, sensor, clutch, PMCE, and/or battery failure on one rotor 109, system 120 can adjust power on the remaining rotor motors in order to re-establish control to minimize the criticality of such failure to a major hazard at the aircraft level. In the event of a motor and/or FCC fault, system 120 can reduce the thrust margin on the one rotor and/or provide commands via the healthy FCC to minimize the criticality of such fault to a minor hazard at the aircraft level. Still other suitable faults will be apparent to one with ordinary skill in the art in view of the teachings herein.

TABLE 1

Redundant Electric Propulsion System Fault Isolation Table

| Part | Single Fault | Immediate Effect | Detection | System Response | Aircraft Level Effect | Criticality |
|---|---|---|---|---|---|---|
| Gearbox/ Rotor shaft | Jam | Loss of one duct out of four | FCC Propulsion Motor No Response monitor trip on all three motors on a given duct | None possible | Loss of one duct out of four | Catastrophic |
| Electric motor | Jam | Failed motor can no longer transmit power to rotor | PMCE Current monitor trip (high threshold) on faulty motor and FCC Propulsion Motor No Response monitor trip on one motor on a given duct | Power adjusted on all remaining duct motors in order to re-establish control | No thrust margin on one of the four ducts, 130-140% thrust capability on the remaining three ducts | Major |
| Electric motor | Shaft disconnect | Failed motor can no longer transmit power to rotor | PMCE Current monitor trip (low threshold) on faulty motor | Power increased on the two other duct motors | No thrust margin on one of the four ducts, 130-140% thrust capability on the remaining three ducts | Minor |
| Electric motor | Winding Open | Max power capability reduced on failed motor due to lost phase | Electric motor Phase Loss monitor trip | Current increased in two other motor phases | Reduced thrust margin on one of the four ducts | Minor |
| Electric motor | Winding Short | Max power capability reduced on failed motor due to Back EMF | Electric motor Phase Loss monitor trip | Current increased in two other motor phases | Reduced thrust margin on one of the four ducts | Minor |
| Electric motor | Position Sensor Disconnect | Failed motor cannot properly commutate | FCC Propulsion Motor No Response monitor or Underspeed trip on one motor on a given duct | Power adjusted on all remaining duct motors in order to re-establish control | No thrust margin on one of the four ducts, 130-140% thrust capability on the remaining three ducts | Major |
| Electric motor | Position Sensor Failed | Failed motor cannot properly commutate | FCC Propulsion Motor No Response monitor or Underspeed trip on one motor on a given duct | Power adjusted on all remaining duct motors in order to re-establish control | No thrust margin on one of the four ducts, 130-140% thrust capability on the remaining three ducts | Major |

TABLE 1-continued

Redundant Electric Propulsion System Fault Isolation Table

| Part | Single Fault | Immediate Effect | Detection | System Response | Aircraft Level Effect | Criticality |
|---|---|---|---|---|---|---|
| Over-run clutch | Jam | None, however next failure (motor jam) can lead to rotor jam | FCC IBIT test of activating each duct motor separately to confirm clutch function | N/A (IBIT and Maintenance action) | N/A (IBIT and Maintenance action) | NSE (no safety effect) |
| Over-run clutch | Open | Associated motor can no longer transmit power to rotor | PMCE Current monitor trip (low threshold) on faulty motor | Power increased on the two other duct motors | No thrust margin on one of the four ducts, 130-140% thrust capability on the remaining three ducts | Major |
| PMCE (Single channel) | Erroneous (Runaway) | Associated motor transmits increased power to rotor on two opposed ducts | FCC Rotor Overspeed monitor trip on two opposed ducts combined with higher power draw on faulty motors | FCC disengages the two associated motors - Power increased on the two other duct motors on two opposed ducts | No thrust margin on two of the four ducts, 130-140% thrust capability on the remaining two ducts | Major |
| PMCE (Single channel) | Failed (Passive) | Associated motor can no longer transmit power to rotor on two opposed ducts | FCC PMCE monitor trip | Power increased on the two other duct motors on two opposed ducts | No thrust margin on two of the four ducts, 130-140% thrust capability on the remaining two ducts | Major |
| PMCE (Single channel) | Generic failure (one type) | Associated motor transmits increased power to rotor on all ducts | FCC Rotor Overspeed monitor trip on all ducts | FCC disengages the four associated motors | No thrust margin at the vehicle level | Major |
| Battery | Erroneous (Runaway) | Over-voltage and thermal runaway | BMS Battery Health monitor trip | BMS passivates battery | Same as loss of one PMCE (No thrust margin on two of the four ducts, 130-140% thrust capability on the remaining two ducts) | Major |
| Battery | Failed (Passive) | Loss on one PMCE and its two associated motors | BMS Battery Health monitor trip and FCC PMCE monitor trip | Power increased on the two other duct motors on two opposed ducts | Same as loss of one PMCE (No thrust margin on two of the four ducts, 130-140% thrust capability on the remaining two ducts) | Major |
| FCC (Com/Mon) | Erroneous (Runaway) | FCC Com or Mon erroneous velocity command on one FCC | FCC Com/Mon Miscompare | FCC passivates its output and declare itself failed - Commands provided by healthy FCC | No functional or performance impact | Minor |
| FCC (Com/Mon) | Failed (Passive) | One of two FCC is no longer available | Healthy FCC detects loss | Commands provided by healthy FCC | No functional or performance impact | Minor |

Method 150 may comprise a step 160 of adjusting the desired torque level based on the analyzed drive characteristic. For instance, propulsion motor control 130 and/or flight control 140 can adjust the desired torque level by increasing or decreasing the desired torque level to actuate motors 122 based on the analyzed drive characteristic. Propulsion motor control 130 and/or flight control 140 can further adjust operation of system 120 based on whether a fault has been detected for one or more of components of system 120. For instance, propulsion motor control 130 and/or flight control 140 can be configured to disconnect and/or shutdown a motor 122 in the event of a fault in the propulsion control of such a motor 122. Propulsion motor control 130 and/or flight control 140 can further be configured to adjust the desired torque levels of the remaining rotors 109 and/or motors 122 that have not been disconnected and/or shutdown. In some versions, system 120 is configured to provide an alert upon the detection of a fault of system 120. Still other suitable methods for operating system 120 will be apparent to one with ordinary skill in the art in view of the teachings herein.

Accordingly, the redundancy provided by system 120 is configured to inhibit a catastrophic failure of aircraft 101 in the event of a failure of a single component of system 120, apart from a rotor 109 separation, such that a failure of any component of system 120 does not cause aircraft 101 to un-balance or experience a loss of control. System 120 is further configured to provide a minimum number of control units and/or computational lanes to lower the cost of system 120 while allowing sufficient functional independence and safety of system 120. Accordingly, system 120 may be lightweight to improve the efficiency of aircraft 101.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A propulsion system for controlling propulsion of an aircraft having two or more rotors, wherein the propulsion system comprises:
   a plurality of electric motors coupled with each rotor of the two or more rotors for driving the two or more rotors;
   a propulsion motor control comprising:
     at least one propulsion control unit electrically connected with at least one electric motor of the plurality of electric motors, wherein the at least one propulsion control unit is configured to actuate the at least one electric motor, and
     at least one battery electrically connected with the at least one propulsion control unit of the propulsion motor control and at least one electric motor of the plurality of electric motors, wherein the at least one battery is configured to provide power to the at least one propulsion control unit and the at least one electric motor; and
   a flight control coupled with the least one propulsion control unit, wherein the flight control is configured to transmit a desired torque level to the at least one propulsion control unit;
   wherein the propulsion motor control is configured to actuate the plurality of electric motors based on the desired torque level to drive two or more rotors to provide propulsion of the aircraft;
   wherein the aircraft comprises four rotors, wherein the propulsion system includes three electric motors coupled with each rotor of the four rotors, wherein the propulsion motor control includes six propulsion control units such that each propulsion control unit is coupled only to a pair of electric motors of the plurality of electric motors, wherein one of the electric motors of the pair of electric motors is coupled with a first rotor and wherein the other of the electric motors of the pair of electric motors is coupled with a second rotor diagonally positioned relative to the first rotor.

2. The propulsion system of claim 1, wherein the at least one propulsion control unit is coupled to a pair of electric motors of the plurality of electric motors, wherein one of the electric motors of the pair of electric motors is coupled with a first rotor positioned on one side the aircraft and wherein the other of the electric motors of the pair of electric motors is coupled with a second rotor positioned on an opposite side of the aircraft relative to the first rotor.

3. The propulsion system of claim 2, wherein the first rotor positioned forward on the aircraft and wherein the second rotor positioned aft on the aircraft.

4. The propulsion system of claim 1, wherein the at least one battery of the propulsion motor control is coupled to a pair of electric motors of the plurality of electric motors, wherein one of the electric motors of the pair of electric motors is coupled with a first rotor positioned on one side of the aircraft and wherein the other of the electric motors of the pair of electric motors is coupled with a second rotor positioned on an opposite side of the aircraft relative to the first rotor.

5. The propulsion system of claim 4, wherein the first rotor positioned forward on the aircraft and wherein the second rotor positioned aft on the aircraft.

6. The propulsion system of claim 1, wherein each rotor comprises a gearbox coupling each electric motor of the plurality of electric motors with the respective rotor of the two or more rotors.

7. The propulsion system of claim 6, wherein each electric motor of the plurality of electric motors comprises an overrun clutch coupling each electric motor with the gearbox, wherein each overrun clutch is configured to transmit torque from the electric motor to the respective rotor in only one direction and is configured to allow the respective rotor to continue rotating when the electric motor is operating at a slower speed relative to the respective rotor.

8. The propulsion system of claim 1, wherein the propulsion system includes three electric motors coupled with each rotor of the two or more rotors.

9. The propulsion system of claim 1, wherein the flight control comprises a pair of flight control units, wherein each flight control unit of the flight control is coupled with at least one propulsion control unit of the propulsion motor control.

10. A method of operating a propulsion system for controlling propulsion of an aircraft having two or more rotors, wherein the propulsion system comprises a plurality of electric motors coupled with each rotor of the two or more rotors, a propulsion motor control having at least one propulsion control unit electrically connected with at least one electric motor of the plurality of electric motors and at least one battery electrically connected with the at least one propulsion control unit of the propulsion motor control and at least one electric motor of the plurality of electric motors, and a flight control coupled with the propulsion motor control, the method comprising the steps of:

transmitting a desired torque level from the flight control to the propulsion motor control; and actuating the plurality of electric motors via the propulsion motor control based on the desired torque level to drive each rotor to provide propulsion of the aircraft;

wherein the aircraft comprises four rotors, wherein the propulsion system includes three electric motors coupled with each rotor of the four rotors, wherein the propulsion motor control includes six propulsion control units such that each propulsion control unit is only coupled to a pair of electric motors of the plurality of electric motors, wherein one of the electric motors of the pair of electric motors is coupled with a first rotor and wherein the other of the electric motors of the pair of electric motors is coupled with a second rotor diagonally positioned relative to the first rotor.

11. The method of claim 10, wherein the propulsion motor control comprises a first propulsion control unit for actuating a first electric motor coupled with a first rotor positioned on one side of the aircraft and a second electric motor coupled with a second rotor positioned on an opposite side of the aircraft relative to the first rotor.

12. The method of claim 10, wherein the propulsion motor control is configured to actuate one or more electric motors at a different desired torque level than another electric motor.

13. The method of claim 10 further comprising:

measuring a drive characteristic of a select one or both of the plurality of electric motors and the two or more rotors; and analyzing the measured drive characteristic.

14. The method of claim 13 further comprising adjusting the desired torque level based on the analyzed drive characteristic.

15. The method of claim 13 further comprising detecting whether a fault of a component of the propulsion system has occurred based on the analyzed drive characteristic.

16. The method of claim 15 further comprising adjusting actuation of the plurality of electric motors based on the detected fault to minimize the criticality of the fault to inhibit aircraft un-balance.

17. The method of claim 15, wherein detecting whether a fault has occurred comprises a select one or more of:

detecting a failure of one or more of the plurality of electric motors via the propulsion motor control;

detecting a failure of a position sensor coupled with one or more of the plurality of electric motors via the flight control;

detecting a failure of the at least one propulsion control units via the flight control; and detecting a failure of the at least one batteries via the flight control.

18. A propulsion system for providing propulsion for an aircraft, wherein the propulsion system comprises:

a plurality of electric motors coupled with at least one rotor of the aircraft such that each electric motor of the plurality of electric motors is configured to drive the at least one rotor; and a propulsion motor control electrically connected with each electric motor of the plurality of electric motors;

wherein the propulsion motor control is configured to actuate each electric motor of the plurality of electric motors based on a desired torque level;

wherein the plurality of electric motors are configured to drive the at least one rotor based on the desired torque level to provide propulsion of the aircraft;

wherein the aircraft comprises four rotors, wherein the propulsion system includes three electric motors coupled with each rotor of the four rotors, wherein the propulsion motor control includes six propulsion control units such that each propulsion control unit is only coupled to a pair of electric motors of the plurality of electric motors, wherein one of the electric motors of the pair of electric motors is coupled with a first rotor and wherein the other of the electric motors of the pair of electric motors is coupled with a second rotor diagonally positioned relative to the first rotor.

19. The propulsion system of claim 18, wherein the propulsion motor control comprises a propulsion control unit for each electric motor of the plurality of electric motors for actuating the respective electric motor and a battery for each electric motor of the plurality of electric motors and the propulsion control unit to provide power to the respective electric motor and the propulsion control unit.

* * * * *